United States Patent
Tanimura

(10) Patent No.: US 10,972,178 B2
(45) Date of Patent: Apr. 6, 2021

(54) PARAMETER ANALYSIS METHOD AND APPARATUS

(71) Applicant: FUJITSU LIMITED, Kawasaki (JP)

(72) Inventor: Takahito Tanimura, Yokohama (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 16/291,086

(22) Filed: Mar. 4, 2019

(65) Prior Publication Data
US 2019/0280766 A1 Sep. 12, 2019

(30) Foreign Application Priority Data
Mar. 8, 2018 (JP) .............................. JP2018-041439

(51) Int. Cl.
*H04B 10/08* (2006.01)
*H04B 10/07* (2013.01)
*G06N 20/00* (2019.01)
*G06N 3/08* (2006.01)

(52) U.S. Cl.
CPC ............. *H04B 10/07* (2013.01); *G06N 20/00* (2019.01); *G06N 3/08* (2013.01)

(58) Field of Classification Search
CPC .......... H04B 10/07; G06N 20/00; G06N 3/08; G06N 3/04
USPC ........................................... 398/25
See application file for complete search history.

(56) References Cited

U.S. PATENT DOCUMENTS

| | | | |
|---|---|---|---|
| 6,714,741 B1 * | 3/2004 | Van De Bergh | H04B 10/07 398/25 |
| 2011/0064169 A1 | 3/2011 | Li et al. | |
| 2014/0029938 A1 * | 1/2014 | Nakashima | G01M 11/336 398/28 |
| 2019/0020524 A1 * | 1/2019 | Finkelstein | H04L 27/34 |

FOREIGN PATENT DOCUMENTS

| | | |
|---|---|---|
| CA | 3019897 | 12/2017 |
| JP | 2012-528491 | 11/2012 |
| JP | 2017-225078 | 12/2017 |

* cited by examiner

*Primary Examiner* — Mohammad R Sedighian
(74) *Attorney, Agent, or Firm* — Fujitsu Patent Center

(57) ABSTRACT

A parameter analysis method executable by a computer, the method includes training a model configured to output an index value relating to a characteristic of an optical signal, and changing the characteristic of the optical signal usable for training the model.

12 Claims, 16 Drawing Sheets

PARAMETER ANALYSIS METHOD AND APPARATUS

CROSS-REFERENCE TO RELATED APPLICATION

This application is based upon and claims the benefit of priority of the prior Japanese Patent Application No. 2018-41439, filed on Mar. 8, 2018, the entire contents of which are incorporated herein by reference.

FIELD

The embodiments discussed herein are related to a model training method, a parameter analysis method, a parameter analysis apparatus, and a storage medium storing a parameter analysis program.

BACKGROUND

A digital coherent optical transmission technology is one of technologies that implement large-volume data transmission. According to a digital coherent optical transmission technology, for example, a digital signal processor (DSP) implemented in a transmitter and a receiver executes multi-level modulation processing such as quadrature amplitude modulation (QAM) and demodulation processing therefor.

For digital signal processing (DSP), many parameters which relate to multi-level modulation/demodulation processing and waveform equalization are set, for example. Accordingly, skilled knowledge and experiences relating to technologies of both an optical region and signal processing region of a digital coherent optical transmission technology may be required for appropriate communication settings in DSP.

In recent years, such a digital coherent optical transmission technology is employed by, as well as telecommunications carriers which provide communication services, data center carriers for implementing data center interconnect (DCI) and carriers in broadband businesses with information technology (IT) systems. For realizing inexpensive communication systems, carriers other than telecommunications carriers configure a network in many cases by employing optical fiber (so-called "dark fiber") not used by telecommunications carriers.

In those cases, a person with insufficient knowledge and experiences may engage in not only the signal processing region but also in the optical region in the digital coherent optical transmission technology by performing inappropriate communication settings, possibly resulting in degraded transmission quality. Against this issue, for example, Japanese National Publication of International Patent Application No. 2012-528491 describes an optical coherent receiver in which a filter factor for phase recovery is optimized.

However, combinations of parameters relating to DSP communication settings include many combinations of parameters correlated in optical signal transmission processing, and therefore it may be difficult in reality to apply the technology described in Japanese National Publication of International Patent Application No. 2012-528491 to all of the combinations. Accordingly, a mathematical equivalent behavior model for analyzing influences of parameters on transmission processing may be constructed through training using actual optical signals, and the model may be used to identify a parameter of a high importance in communication settings.

However, optical signals have characteristics depending on various conditions of optical components and electrical components in an optical transmitter/receiver and optical fiber, which means that the model may not be sufficiently trained in a realistic time period and that improving precision of the model may be difficult. This issue also exists in other optical signal transmission technologies, without limiting to the digital coherent optical transmission technology.

In view of these circumstances, it is desirable to provide a model training method, a parameter analysis method, and a parameter analysis apparatus, which may construct a mathematical model with high precision for analysis of influences of parameters in communication settings for optical signal transmission processing, and to provide a storage medium storing a parameter analysis program.

SUMMARY

According to an aspect of the embodiments, a parameter analysis method executable by a computer, the method includes training a model configured to output an index value relating to a characteristic of an optical signal, and changing the characteristic of the optical signal usable for training the model.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
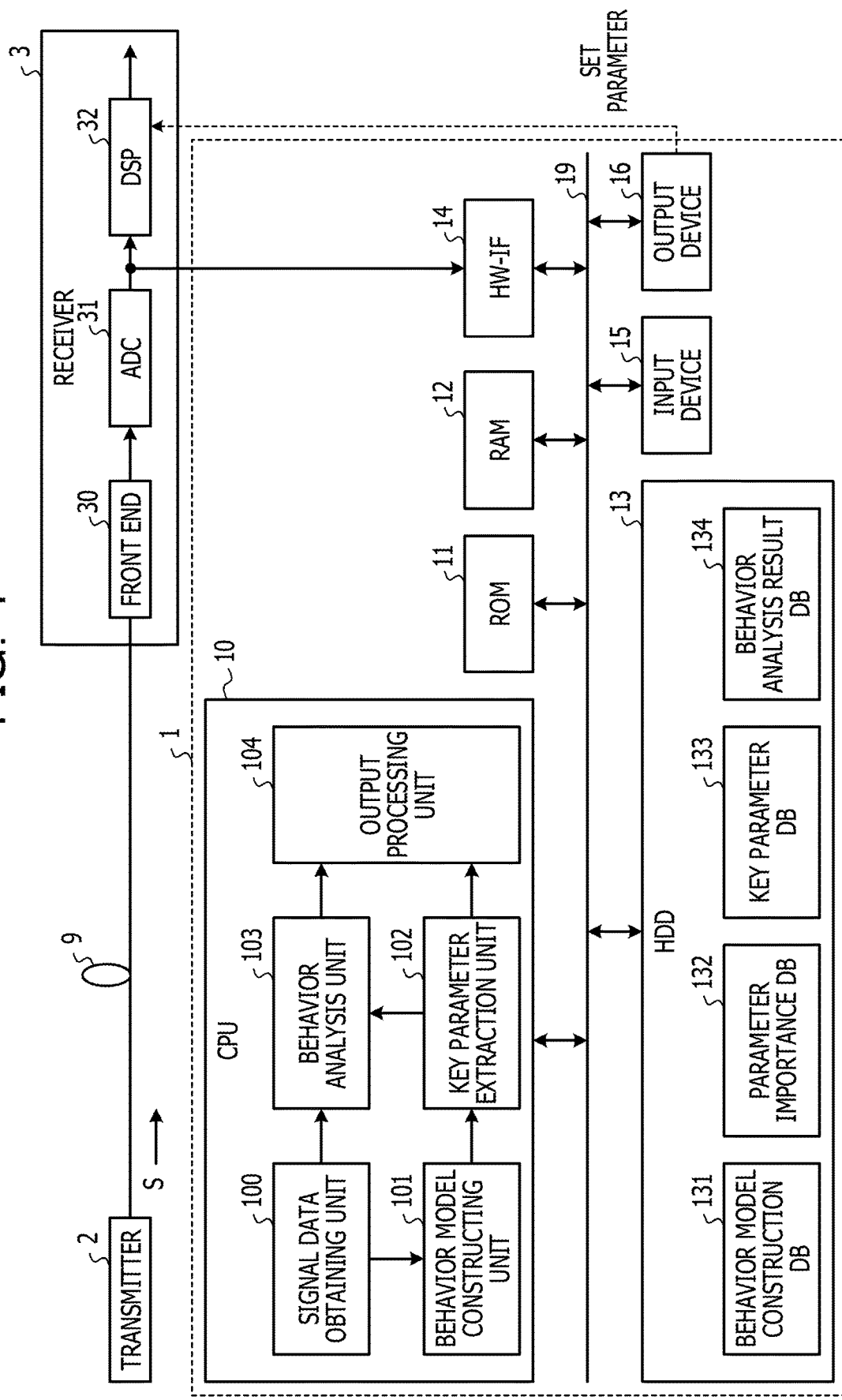
FIG. 1 is a schematic diagram illustrating an example of a parameter analysis apparatus.

FIG. 1 is a schematic diagram illustrating an example of a parameter analysis apparatus 1. The parameter analysis apparatus 1 is configured to obtain signal data from a receiver 3 configured to receive an optical signal S from a transmitter 2 via a transmission path 9 such as optical fiber and thus to constructs a mathematical behavior model through training using the signal data.

The transmitter 2 transmits the optical signal S to the receiver 3 by following a digital coherent optical transmission technology, for example. The transmitter 2 modulates an Ethernet (registered trademark where the same is true below) signal by a multi-level modulation technology such as QAM and generates an optical signal S of optical polarization division multiplexing by modulating transmission light based on the Ethernet signal. The receiver 3 has a front end 30, an analog-digital converter (ADC) 31, and a DSP 32.

The front end 30 has an optical electrical converter and is configured to convert an optical signal S to electrical signal data and output the electrical signal data to the ADC 31. The ADC 31 is configured to convert the signal data from an analog signal to a digital signal and output the digital signal to the DSP 32 and the parameter analysis apparatus 1.

The DSP 32 is an example of a signal processing device and is configured to perform signal processing on the signal data of the optical signal S. The signal processing may be compensation processing for wavelength dispersion and a non-linear optical effect on the transmission path 9, compensation processing for imperfection of optical electrical conversion, phase recovery processing, demodulation processing or the like.

In the DSP 32, parameters relating to signal processing are set by a person in charge (operator) of communication settings, not illustrated, or from a setting device, not illustrated (see the broken line arrow in FIG. 1). The parameters may include an averaging length for offset values of a phase in phase recovery processing and the number and order of filters usable for imperfection compensation processing.

The parameter analysis apparatus 1 includes a central processing unit (CPU) 10, a read only memory (ROM) 11, a random access memory (RAM) 12, a hard disk drive (HDD) 13, a hardware interface unit (HW-IF) 14, an input device 15, and an output device 16. For mutual signal input/output, the CPU 10 is connected with the ROM 11, the RAM 12, the HDD 13, the HW-IF 14, the input device 15, and the output device 16 via a bus 19. The CPU 10 is an example of a computer.

The ROM 11 is configured to store programs configured to drive the CPU 10. The programs include a parameter analysis program configured to execute a parameter analysis method. The RAM 12 functions as a working memory for the CPU 10. The HW-IF 14 includes hardware modules such as a field programmable gate array (FPGA) and an application specified integrated circuit (ASIC) and receives signal data of an optical signal S from the ADC 31 in the receiver 3. The HW-IF 14 is configured to output the signal data of the optical signal S to the CPU 10 via the bus 19.

The input device 15 is configured to be used for inputting information to the parameter analysis apparatus 1. The input device 15 may be a keyboard, a mouse, or a touch panel, for example. The input device 15 is configured to output information input thereto to the CPU 10 via the bus 19.

The output device 16 is configured to output information in the parameter analysis apparatus 1. The output device 16 may be a display, a touch panel, or printer, for example. The output device 16 is configured to obtain and output information from the CPU 10 via the bus 19.

When the CPU 10 reads out programs from the ROM 11, a signal data obtaining unit 100, a behavior model constructing unit 101, a key parameter extraction unit 102, a behavior analysis unit 103, and an output processing unit 104 are functionally formed. The HDD 13 stores a behavior model construction database (DB) 131, a parameter importance DB 132, a key parameter DB 133, and a behavior analysis result DB 134. The signal data obtaining unit 100, the behavior model constructing unit 101, the key parameter extraction unit 102, the behavior analysis unit 103, and the output processing unit 104 may be configured by an electronic circuit including hardware modules such as an FPGA and an ASIC.

The signal data obtaining unit 100 is configured to obtain signal data from the receiver 3 through the HW-IF 14. The signal data obtaining unit 100 is configured to output signal data to the behavior model constructing unit 101 and the behavior analysis unit 103.

The behavior model constructing unit 101 uses the signal data and the parameters in communication settings in the DSP 32 to train and thus construct a behavior model.

The behavior model is an example of a mathematical model which learns behaviors of the receiver 3 through training, receives input of a parameter for a communication setting in the DSP 32 and outputs a Q value of the optical signal S processed by the DSP 32. The behavior model is used for analyzing influences given by a plurality of parameters for communication settings in the DSP 32 on the Q value. The behavior model constructing unit 101, as a result of training by the behavior model, computes functions and numerical values (hereinafter called "training information") defining the behavior model and registers them with the behavior model construction DB 131.

Figure 2:
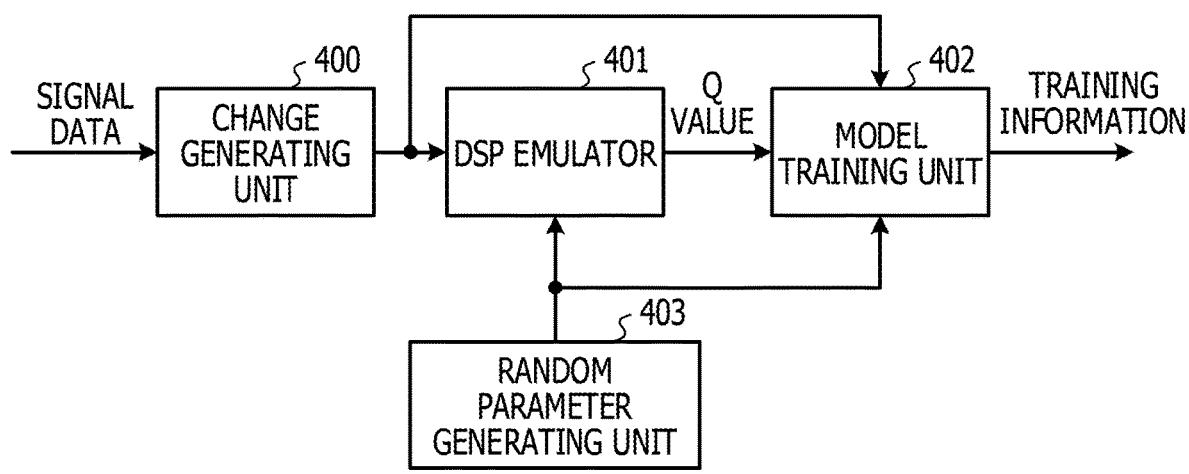
FIG. 2 is a schematic diagram illustrating an example of a behavior model constructing unit.

FIG. 2 is a schematic diagram illustrating an example of the behavior model constructing unit 101. The behavior model constructing unit 101 has a change generating unit 400, a DSP emulator 401, a model training unit 402, and a random parameter generating unit 403.

The random parameter generating unit 403 is an example of a generating unit and is configured to generate parameters in communication settings in the DSP 32 by using random numbers. The random parameter generating unit 403 is configured to output the parameters to the DSP emulator 401 and the model training unit 402.

The DSP emulator 401 is configured to emulate an operation performed by the DSP 32. The DSP emulator 401 is configured to process signal data input from the change generating unit 400 by implementing the same function as that of the DSP 32 and output a Q value of the optical signal S to the model training unit 402. The Q value is an example of an index value relating to a characteristic of the optical signal S. However, the index value is not limited to the Q value but may be a bit error rate of the receiving side of the optical signal S or a margin amount to a receive threshold optical signal-to-noise ratio (OSNR).

The DSP emulator 401 is configured to process signal data based on parameters input from the random parameter generating unit 403, compute a Q value from the processed signal data and output it to the model training unit 402. The random parameter generating unit 403 randomly changes numerical values of the parameters at predetermined time intervals, for example.

The model training unit 402 is an example of a training unit and is configured to train a behavior model. The training uses a Q value as output data, communication setting parameters and signal data as input data, and signal data for computing the Q value.

Figure 3:
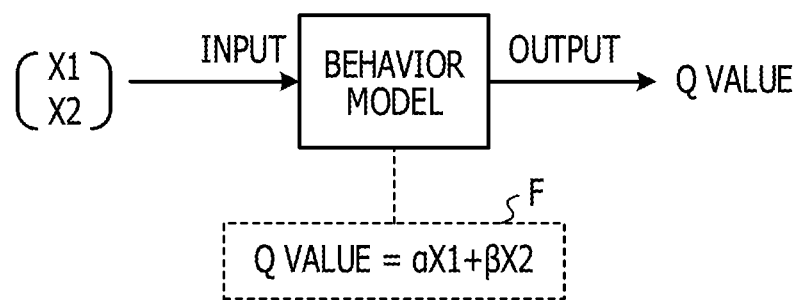
FIG. 3 is a diagram conceptually illustrating a simplified behavior model.

FIG. 3 is a diagram conceptually illustrating a simplified behavior model. The behavior model computes a Q value from communication setting parameters X1 and X2 by using an expression F "Q value=αX1+βX2". The model training unit 402 computes appropriate factors α and β of Expression F as training information.

Referring back to FIG. 2, the model training unit 402 registers the training information acquired through training with the behavior model construction DB 131. The behavior model learns behaviors of the receiver 3 by accumulating the training information.

A behavior model may be constructed by using the following technologies, for example:

support vector machine, logistic regression, random forest, principal component analysis, neural network (including those not using deep learning), or deep neural network The deep neural network may be a fully connected deep neural network, a convolutional deep neural network, or a recursive deep neural network (including long short-term memory (LSTM) neural network), for example. These deep neural network technologies may have a skip connection, an attention mechanism, or a DropOut used inference engine.

Signal data of an optical signal S is used for the training. However, because the optical signal S has a characteristic depending on various conditions of the transmitter 2 and the transmission path 9, the model training unit 402 may not sufficiently train the behavior model when the signal data directly obtained from the receiver 3 is used for the training. More specifically, for example, signal data obtained from the receiver 3 results in a deflected characteristic of the optical signal S. Therefore, the behavior model outputs a precise Q value when signal data limited to a predetermined condition is input thereto but outputs an imprecise Q value when signal data not under the condition is input thereto.

Characteristics of an optical signal S that deflect may be a polarization state and an optical carrier frequency. The polarization state and the optical carrier frequency are normally settled. However, the polarization state, for example, rapidly changes due to an indefinite element such as a change of the bend angle of optical fiber. Such a change suddenly occurs at a frequency of several times a year, for example. A behavior model which is insufficiently trained may not address the circumstance and outputs an analysis result with low precision.

Accordingly, the change generating unit 400 intentionally generates and outputs such a sudden change in signal data to the model training unit 402. In other words, the change generating unit 400 changes a characteristic of the optical signal S. Thus, a highly precise behavior model may be constructed which may address various conditions of a characteristic of the optical signal S. Examples of the change generating unit 400 will be described below.

Figure 4:
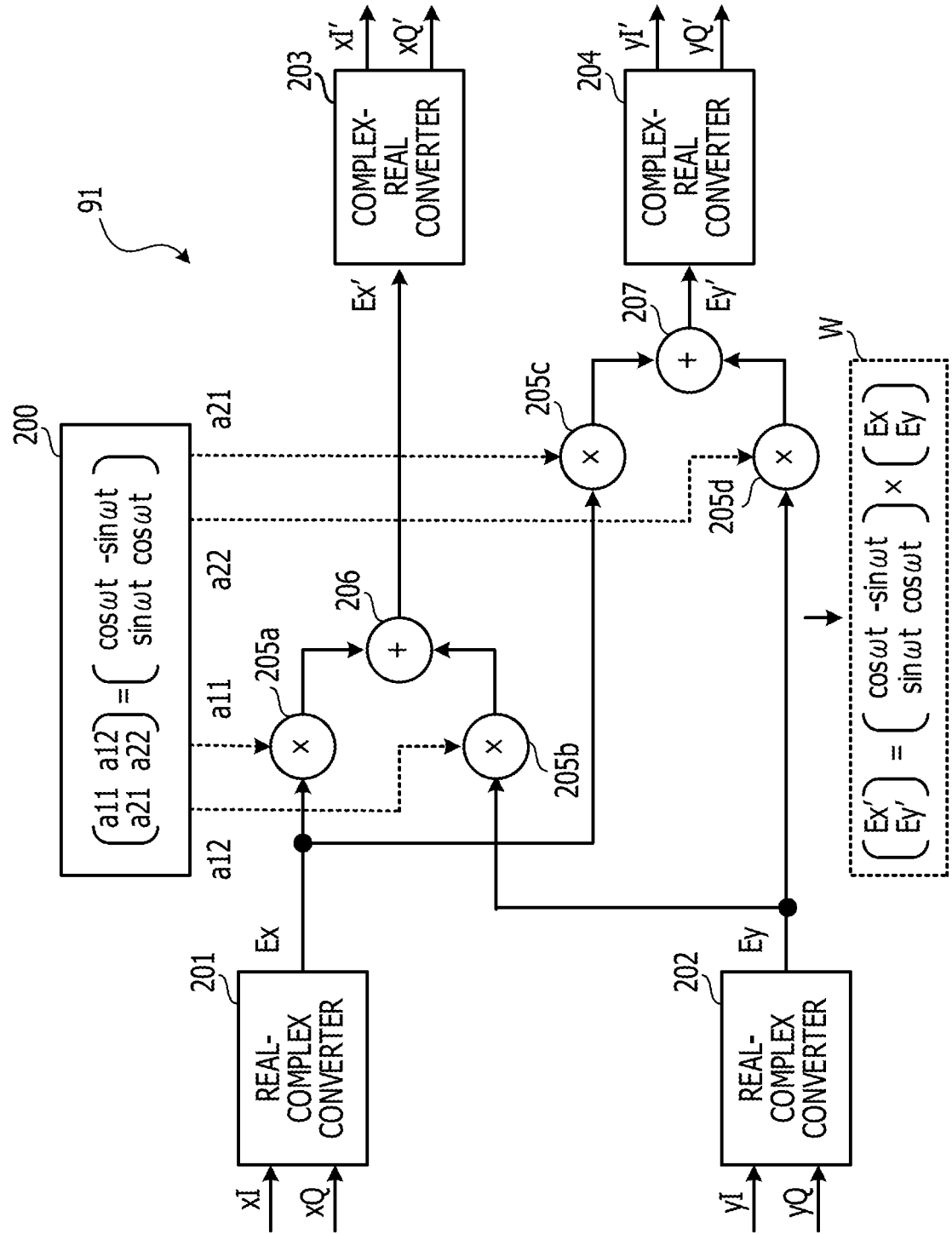
FIG. 4 illustrates an example of a configuration of a change generating unit which changes a polarization state.

FIG. 4 illustrates an example of a configuration of the change generating unit 400 configured to change a polarization state. The change generating unit 400 has a polarized-wave rotation generator 200, real-complex converters 201 and 202, complex-real converters 203 and 204, multipliers 205a to 205d, and adders 206 and 207. The change generating unit 400 is configured by software but may be configured by a circuit such as an FPGA and an ASIC.

The signal data of the optical signal S may contain, for example, a real number component xI and an imaginary number component xQ of an X polarized wave and a real number component yI and an imaginary number component yQ of a Y polarized wave. The real number component xI and imaginary number component xQ of the X polarized wave are input to the real-complex converter 201, and the real number component yI and imaginary number component yQ of the Y polarized wave are input to the real-complex converter 202. The real-complex converter 201 converts the real number component xI and the imaginary number component xQ to an electric field signal Ex being a complex number, and the real-complex converter 202 converts the real number component yI and the imaginary number component yQ to an electric field signal Ey being a complex number.

The electric field signal Ex is input to the multipliers 205a and 205c, and the electric field signal Ey is input to the multipliers 205b and 205d. The polarized-wave rotation generator 200 outputs operation parameters a11, a12, a21, and a22 for rotating the polarized waves to the multipliers 205a to 205d, respectively.

$$a11 = \cos \omega t \quad (1)$$

$$a12 = -\sin \omega t \quad (2)$$

$$a21 = \sin \omega t \quad (3)$$

$$a22 = \cos \omega t \quad (4)$$

The operation parameters a11, a12, a21, and a22 are elements of a matrix for computing a polarized wave rotation and are expressed by the expressions (1) to (4) above. In the expressions (1) to (4), a variable ω is a rotation speed of the polarized waves, and a variable t is a time period.

The multiplier 205a multiplies the electric field signal Ex by the operation parameter a11 and outputs the value acquired by the multiplication to the adder 206. The multiplier 205b multiplies the electric field signal Ey by the operation parameter a12 and outputs the value acquired by the multiplication to the adder 206. The adder 206 adds the values from the multipliers 205a and 205b to acquire an electric field signal Ex' and outputs it to the complex number-real number converter 203.

The multiplier 205c multiplies the electric field signal Ex by the operation parameter a21 and outputs the value acquired by the multiplication to the adder 207. The multiplier 205d multiplies the electric field signal Ey by the operation parameter a22 and outputs the value acquired by the multiplication to the adder 207. The adder 207 adds the values from the multipliers 205c and 205d to acquire an electric field signal Ey' and outputs it to the complex number-real number converter 204.

Thus, the electric field signals Ex' and Ey' after the polarized wave rotation are elements of a matrix acquired by multiplying a matrix of 2 rows×1 column having the electric field signals Ex and Ey as its elements by a matrix of 2 rows×2 columns having the operation parameters a11, a12, a21, and a22 as its elements, which is indicated by reference "W".

The complex number-real number converter 203 converts the electric field signal Ex' to a real number component xI' and an imaginary number component xQ' of the X polarized wave, and the complex number-real number converter 204 converts an electric field signal Ey' to a real number component yI' and an imaginary number component yQ' of the Y polarized wave.

Thus, the change generating unit 400 rotates the polarized wave of the optical signal S. Therefore, the behavior model may output a precise Q value even when the polarized wave of the optical signal S is rotated.

Figure 5:
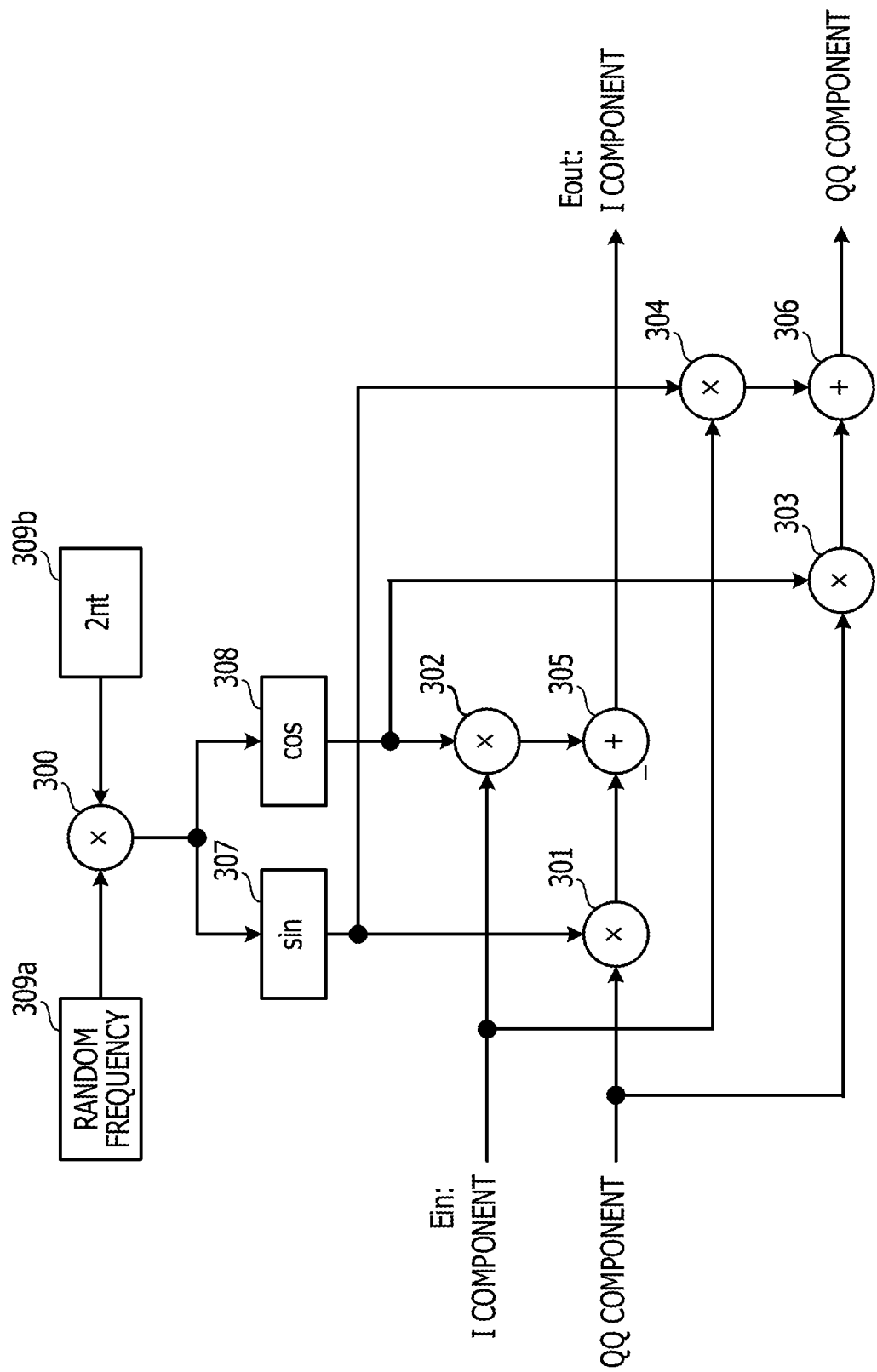
FIG. 5 illustrates an example of a configuration of a change generating unit which changes a frequency offset due to a change of an optical carrier frequency.

FIG. 5 illustrates an example of a configuration of the change generating unit 400 which changes a frequency offset by changing an optical carrier frequency. The change generating unit 400 has multipliers 300 to 304, adders 305 and 306, a sine operator 307, a cosine operator 308, a random frequency generator 309a, and a time generator 309b. The change generating unit 400 is configured by software but may be configured by a circuit such as an FPGA and an ASIC.

The optical signal S has signal data containing a real number component (I component) and an imaginary number component (Q component) of an electrolyte signal Ein. The I component is input to the multipliers 302 and 304, and the Q component is input to the multipliers 301 and 303.

The random frequency generator 309a is configured to generate a frequency f of a random number and outputs it to the multiplier 300. The time generator 309b is configured to output to the multiplier 300 a value $2\pi t$ acquired by multiplying a time t ($=\Delta T, 2\times\Delta T, 3\times\Delta T, \ldots$), which changes at strides width $\Delta T$, by a constant $2\pi$. The multiplier 300 outputs a multiplication value $2\pi ft$ of the frequency f and a value $2\pi t$ to the sine operator 307 and the cosine operator 308. The sine operator 307 is configured to calculate $\sin 2\pi ft$ from the input value and output it to the multipliers 301 and 304. The cosine operator 308 is configured to calculate $\cos 2\pi ft$ from the input value and output it to the multipliers 302 and 303.

The multiplier 301 is configured to multiply the $\sin 2\pi ft$ and the Q component and output the result to the adder 305. The multiplier 302 is configured to multiply the $\cos 2\pi ft$ and the I component and output the result to the adder 305. The adder 305 subtracts the multiplication value of the multiplier 301 from the multiplication value of the multiplier 302 and outputs the result as an I component of the electrolyte signal Eout having its frequency changed.

The multiplier 304 is configured to multiply the $\sin 2\pi ft$ and the I component and output the result to the adder 306. The multiplier 303 is configured to multiply the $\cos 2\pi ft$ and the Q component and output the result to the adder 306. The adder 306 adds the multiplication value of the multiplier 304 and the multiplication value of the multiplier 303 and outputs the result as a Q component of the electrolyte signal Eout.

$$Eout=Ein\times\exp(2\pi ft) \quad (5)$$

Thus, the electrolyte signal Eout of a data signal having its frequency changed may be acquired from Expression (5). The change generating unit 400 changes the optical carrier frequency of the optical signal S as an example of a frequency. Therefore, the behavior model may output a precise Q value even when the optical carrier frequency of the optical signal S changes. Instead of changes of the polarized wave rotation and the frequency, the change generating unit 400 may cause a polarization dependent loss (PDL), a frequency filtering, a polarization mode dispersion (PMD), a cross phase modulation (XPM), and a self phase modulation (SPM).

The behavior model constructing unit 101, as described above, causes a behavior model to learn behaviors of the receiver 3 through training of the behavior model to construct a behavior model which may analyze with high precision influences caused by communication setting parameters in the DSP 32 on a Q value.

Figure 6A:
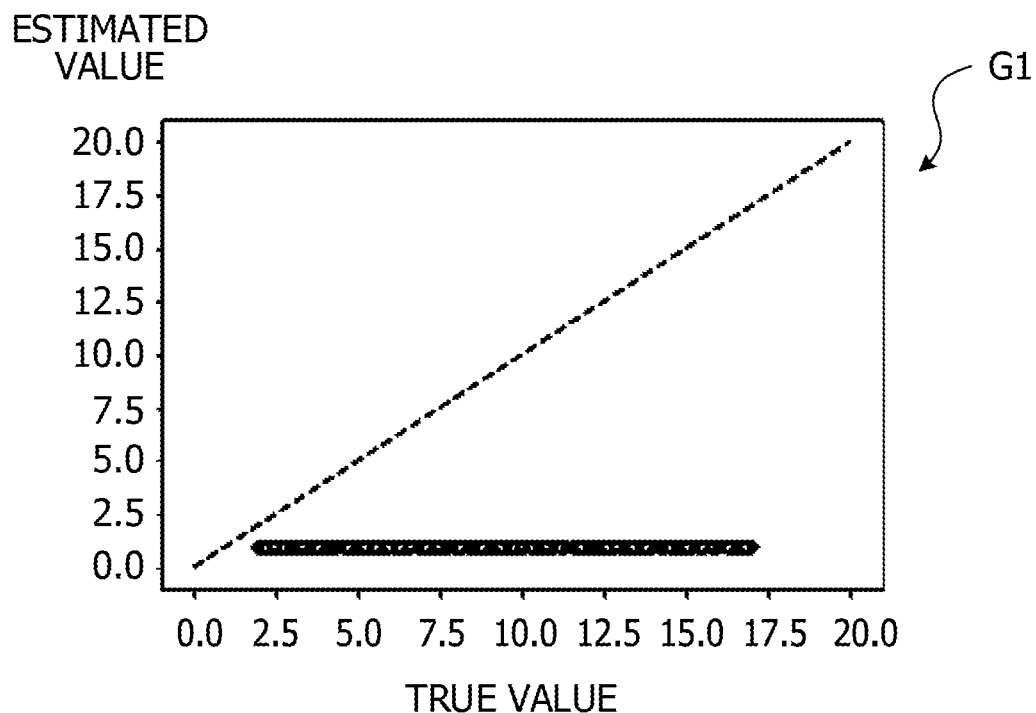
FIGS. 6A and 6B illustrate estimated values for Q values (quality factors) of a behavior model before and after training.
Figure 6B:
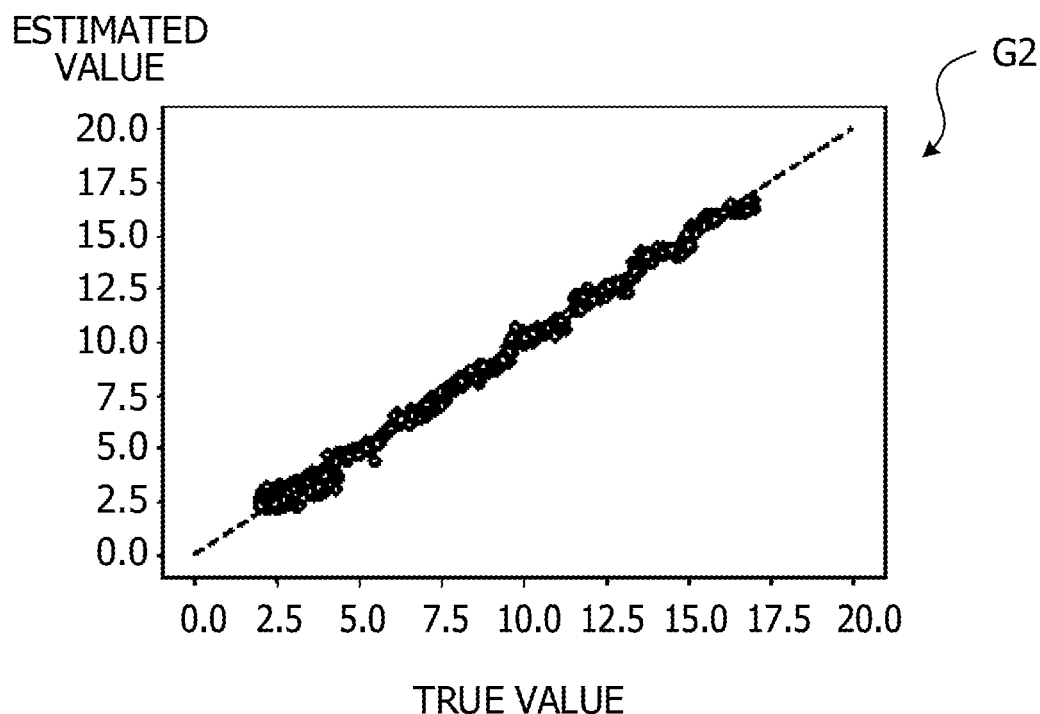

FIGS. 6A and 6B illustrate estimated values for a Q value of a behavior model before and after completion of training.

FIG. 6A is a graph G1 illustrating estimated values before training, and FIG. 6B is a graph G2 illustrating estimated values after the training. The graphs G1 and G2 in FIGS. 6A and 6B have a horizontal axis indicating true values (expected values) of a Q value and a vertical axis indicating estimated values.

As understood from the graphs G1 and G2, the completely trained behavior model outputs estimated values substantially being matched with the true values. Thus, the precision of the analysis with the behavior model increases through the training.

Referring back to FIG. 1, when the training of the behavior model completes, the behavior model constructing unit 101 notifies it to the key parameter extraction unit 102. The completion of the training is determined by, for example, mathematically analyzing the convergence of training information registered with the behavior model construction DB 131 and determining whether the convergence reaches a predetermined value or not. The key parameter extraction unit 102 starts its operation in response to a notification from the behavior model constructing unit 101.

The key parameter extraction unit 102 is an example of an extraction unit, and is configured to use the completely trained behavior model to extract one or more parameters having a degree of influence on a Q value equal to or higher than a predetermined value from the communication setting parameters in the DSP 32. For example, the key parameter extraction unit 102 searches for the training information in the behavior model construction DB 131 to compute an importance of each parameter (hereinafter, called "parameter importance") as the degree of influence on the Q value. The parameter importance is determined based on the magnitudes of the factors $\alpha$ and $\beta$ corresponding to the parameters X1 and X2, respectively, illustrated in FIG. 3, for example.

The key parameter extraction unit 102 registers importance of each parameter with the parameter importance DB 132 in association with an identification number (parameter number) of the parameter. The key parameter extraction unit 102 extracts a key parameter based on its parameter importance registered with the parameter importance DB 132 and registers its parameter number with the key parameter DB 133.

Figure 7:
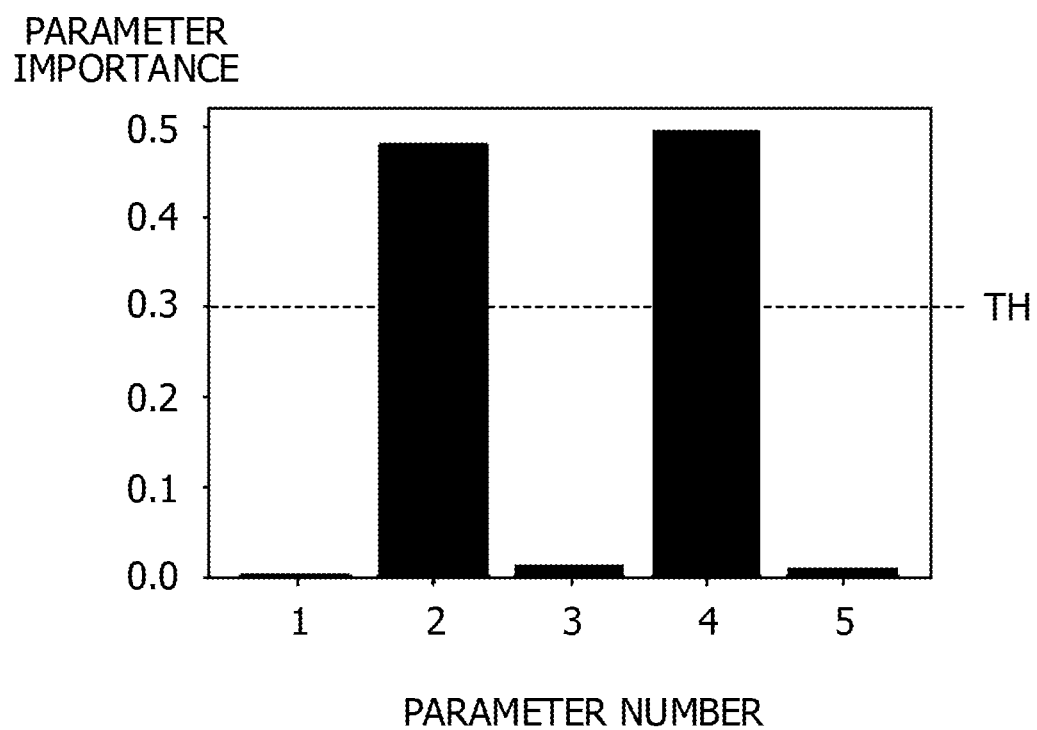
FIG. 7 illustrates examples of parameter importance.

FIG. 7 illustrates examples of the parameter importance. FIG. 7 has a horizontal axis having parameter numbers "1" to "5" and a vertical axis indicating parameter importance. The key parameter extraction unit 102 has a threshold value TH set to 0.3, for example, for parameter importance as a condition for determining a key parameter. In this case, the key parameter extraction unit 102 extracts, as a key parameter, parameters with parameter numbers "2" and "4" having parameter importance equal to or higher than 0.3.

Referring back to FIG. 1, the key parameter extraction unit 102 after the extraction of a key parameter completes notifies it to the behavior analysis unit 103 and the output processing unit 104. The output processing unit 104 accesses the key parameter DB 133 in response to the notification and outputs the key parameter to the output device 16. The output device 16 displays the key parameter on a screen, for example. Thus, a parameter having a high importance may be determined even by a person in charge of communication setting with insufficient knowledge and experiences relating to the digital coherent optical transmission technology.

The behavior analysis unit 103 starts its operation in response to the notification from the key parameter extraction unit 102. The behavior analysis unit 103 accesses the key parameter DB 133 and obtains a key parameter. The behavior analysis unit 103 analyzes the amount of change of the Q value when the key parameter change by using the signal data input from the signal data obtaining unit 100. The behavior analysis unit 103 registers the analysis result with the behavior analysis result DB 134 and further outputs the analysis result to the output processing unit 104. The output processing unit 104 outputs the analysis result to the output device 16, and the output device 16 displays the analysis result on a screen, for example.

Figure 8:
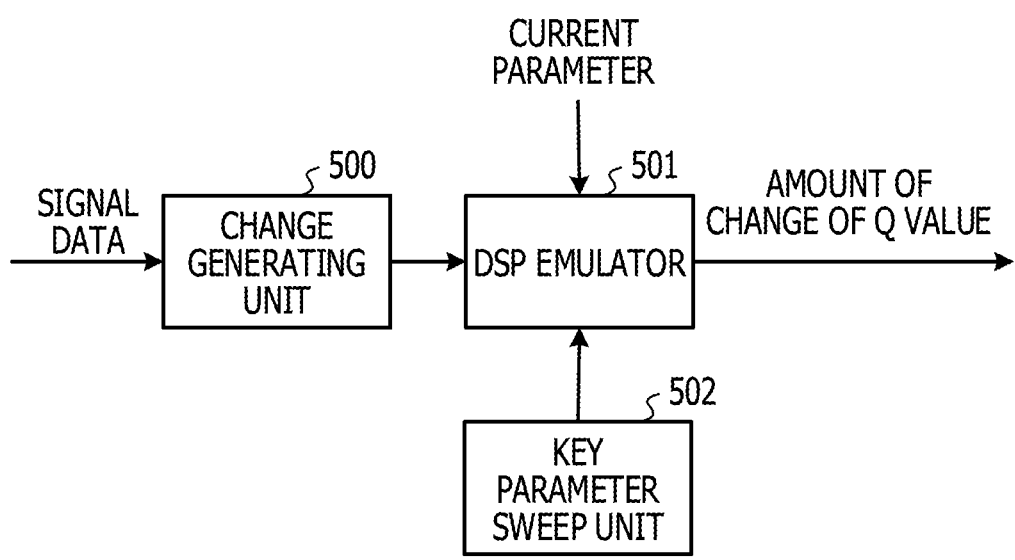
FIG. 8 is a schematic diagram illustrating an example of a behavior analysis unit.

FIG. 8 is a schematic diagram illustrating an example of the behavior analysis unit 103. The behavior analysis unit 103 has a change generating unit 500, a DSP emulator 501, and a key parameter sweep unit 502. The change generating unit 500 has functionality identical to that of the change generating unit 400 of the behavior model constructing unit 101. The DSP emulator 501 has functionality identical to that of the DSP emulator 401 of the behavior model constructing unit 101. The change generating units 400 and 500 and the DSP emulators 401 and 501 may be configured as common function blocks.

The key parameter sweep unit 502 changes and sets the key parameter in the DSP emulator 501. The DSP emulator 501 has the current parameter set in the DSP 32. The DSP emulator 501 outputs an amount of change of the Q value based on the changes of the key parameter.

Figure 9:
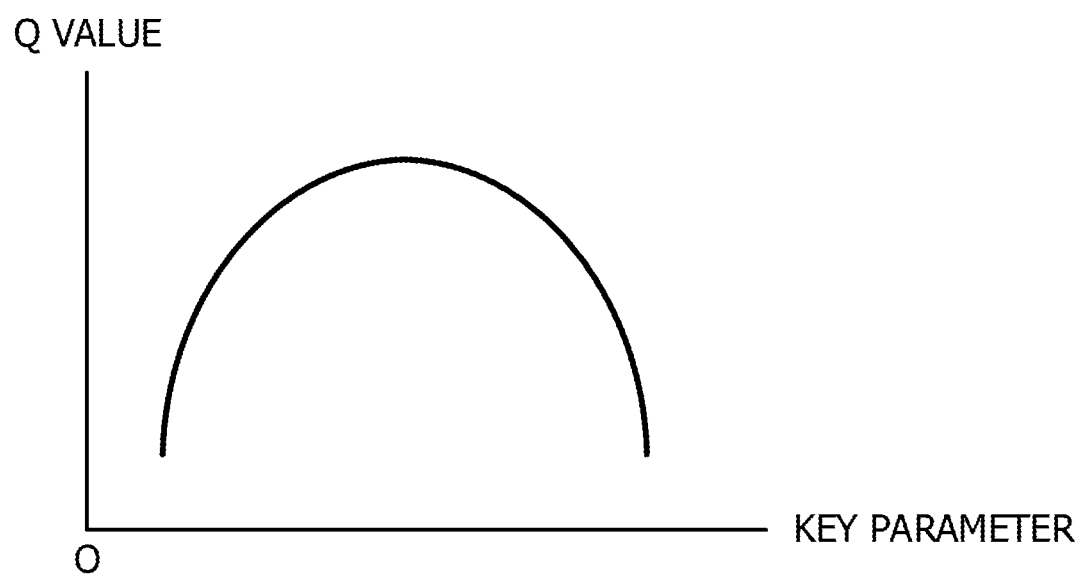
FIG. 9 illustrates an example of change of the Q value against changes of a key parameter.

FIG. 9 illustrates an example of change of the Q value against changes of a key parameter. FIG. 9 has a horizontal axis indicating key parameter and a vertical axis indicating Q value. The Q value changes as it renders a parabola, for example, against changes of the key parameter. From this analysis result, the key parameter may be set to a value with a peak Q value.

The behavior analysis unit 103 changes an extracted key parameter and analyzes changes of the Q value against the changes of the key parameter. Thus, a person in charge of communication setting who has insufficient knowledge and experiences about the digital coherent optical transmission technology may determine an influence of the key parameter on the Q value.

Figure 10:
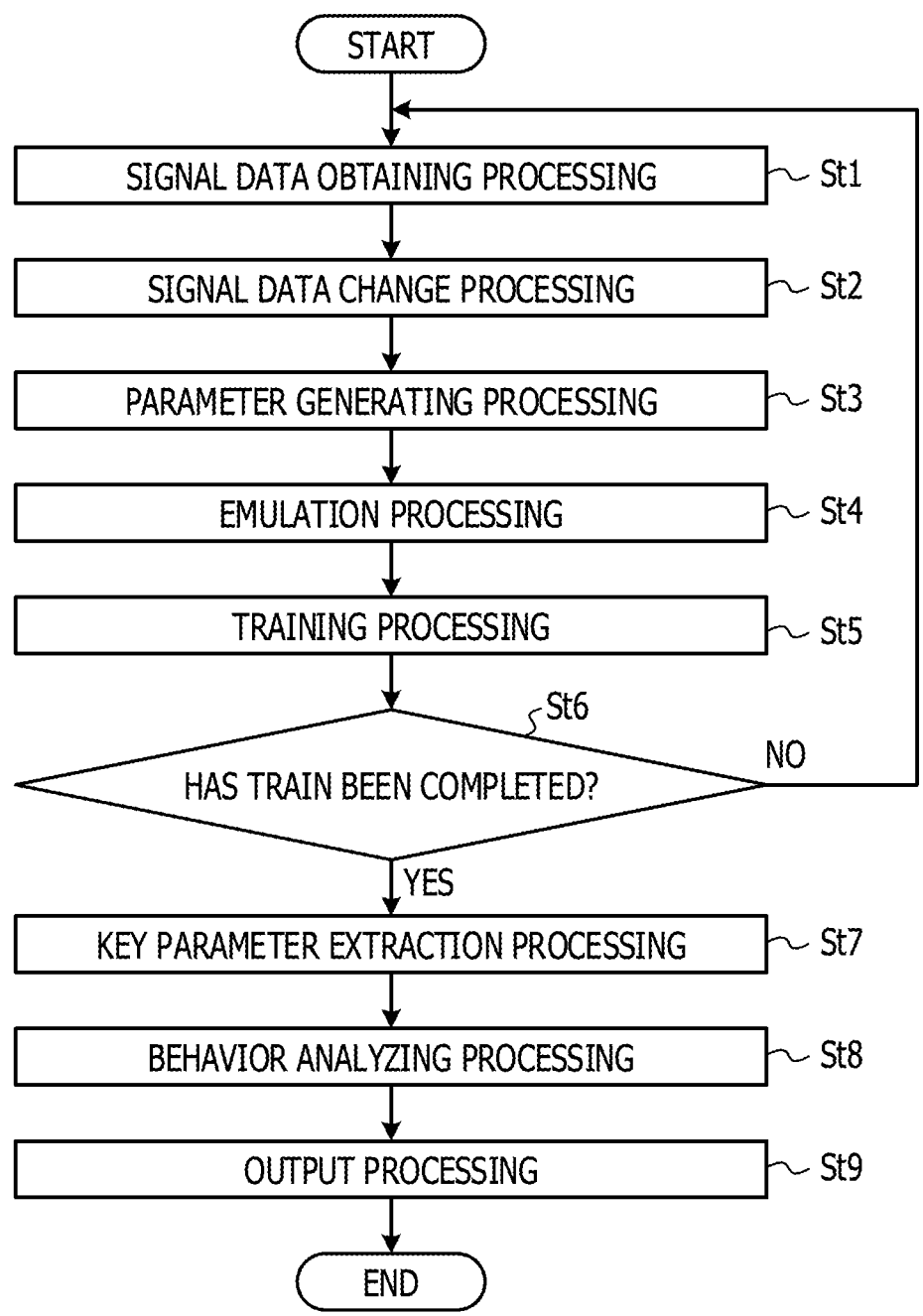
FIG. 10 is a flowchart illustrating processing to be performed by the parameter analysis apparatus.

FIG. 10 is a flowchart illustrating processing to be performed by the parameter analysis apparatus 1. The signal data obtaining unit 100 obtains signal data from the receiver 3 (step St1). Next, the change generating unit 400 changes a characteristic of the signal data used for training (step St2).

The random parameter generating unit 403 generates a parameter usable for training (step St3). The generated parameter is set in the DSP emulator 401.

Next, the DSP emulator 401 executes emulation processing of the DSP 32 (step St4). The DSP emulator 401 calculates a Q value from the signal data.

Next, the model training unit 402 trains the behavior model (step St5). Next, the model training unit 402 determines whether the training has been completed or not (step St6). When the training has not been completed (No in step St6), the processing in and after step St1 is executed.

When the training has been completed (Yes in step St6), the key parameter extraction unit 102 extracts one or more key parameters from a plurality of parameters in communication settings in the DSP 32 by using the trained behavior model (step St7).

Next, the behavior analysis unit 103 changes the key parameter and analyzes changes of the Q value against the changes of the key parameter (step St8). Next, the output processing unit 104 outputs the key parameter and the analysis results to the output device 16 (step St9). An operator or a setting device sets in the DSP 32 the key parameter based on the analysis results output to the output device 16. Thus, a person in charge of communication setting who has insufficient knowledge and experiences about the digital coherent optical transmission technology may set an appropriate key parameter or parameters in the DSP 32. The processing executed by the parameter analysis apparatus 1 has been described.

The model training unit 402 may weight the reliabilities of signal data based on the Q value calculated from the signal data by the DSP emulator 401 and control training based on results of the weighting.

Figure 11:
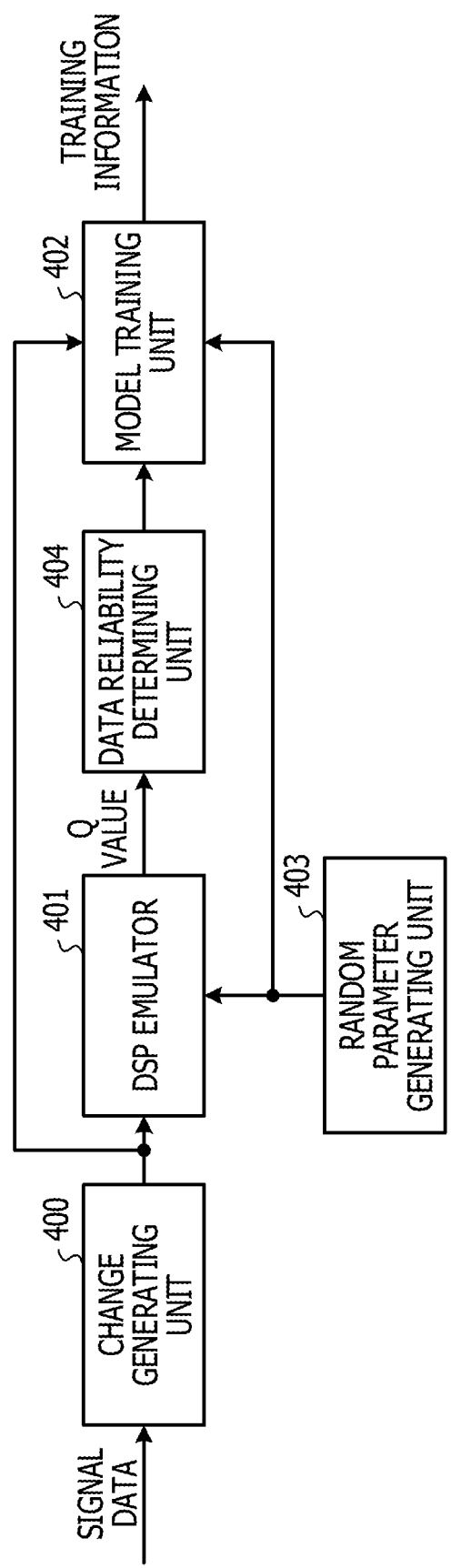
FIG. 11 is a schematic diagram illustrating another example of the behavior model constructing unit.

FIG. 11 is a schematic diagram illustrating another example of the behavior model constructing unit 101. Like numbers refer to like parts in FIG. 2 and FIG. 11, and any repetitive descriptions will be described.

In this example, the behavior model constructing unit 101 further has a data reliability determining unit 404. The DSP emulator 401 calculates a Q value from signal data and outputs it to the data reliability determining unit 404. The data reliability determining unit 404 is an example of a weighting processing unit and is configured to weight the signal data by regarding the Q value as a reliability of the signal data and notifies the result to the model training unit 402.

The model training unit 402 is configured to control training based on the result of the weighting. Thus, the model training unit 402 may improve efficiency of the training.

The model training unit 402 trains a behavior model by using signal data of an optical signal S and parameters set in the DSP 32 in the receiver 3. However, the model training unit 402 may train by further using transmission-side parameters set in the transmitter 2.

Figure 12:
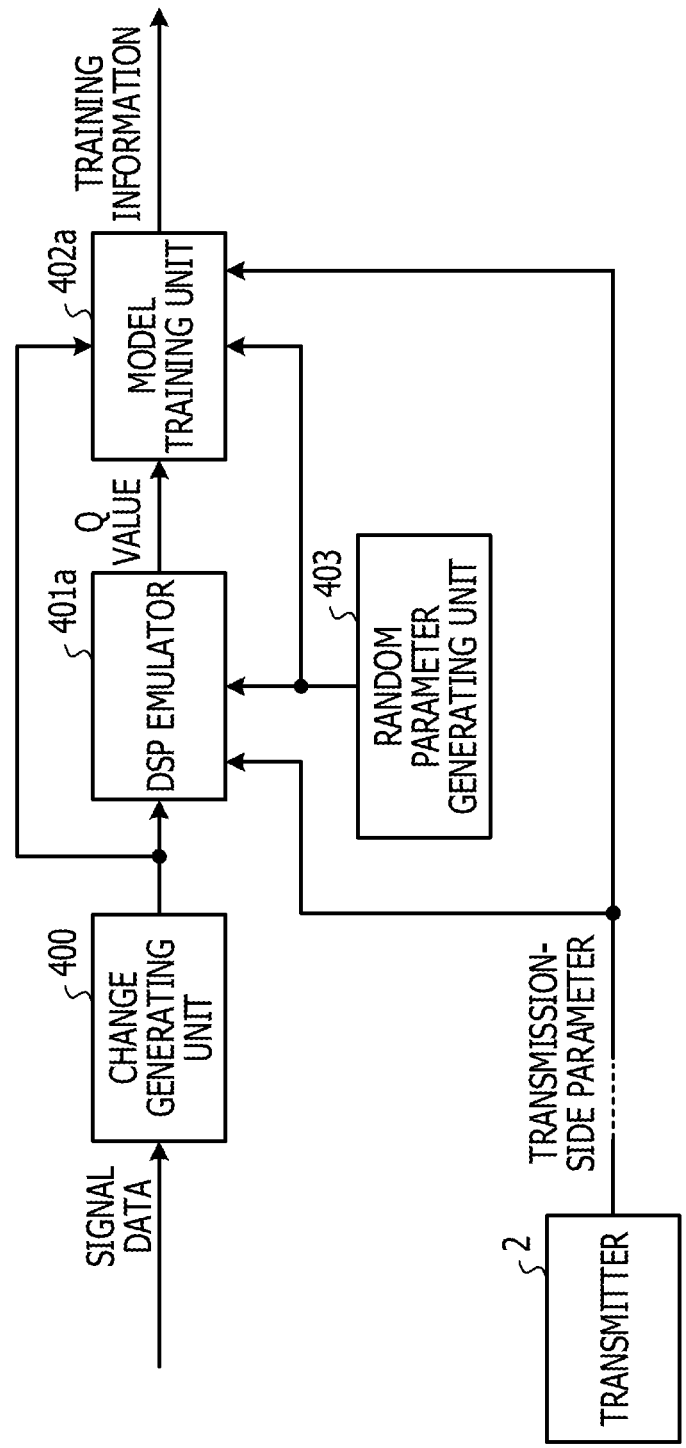
FIG. 12 is a schematic diagram illustrating another example of the behavior model constructing unit.

FIG. 12 is a schematic diagram illustrating another example of the behavior model constructing unit 101. Like numbers refer to like parts in FIG. 2 and FIG. 12, and any repetitive descriptions will be described.

The behavior model constructing unit 101 has the change generating unit 400, a DSP emulator 401a, a model training unit 402a, and the random parameter generating unit 403. The DSP emulator 401a and model training unit 402a receive parameters in the DSP 32, which are generated by the random parameter generating unit 403, and signal data as well as the transmission-side parameters set in the transmitter 2.

The parameter analysis apparatus 1 obtains the transmission-side parameters from the transmitter 2 over a network for management, for example. The transmission-side parameters include, for example, the number and order of filters usable in a pre-equalization process performed on the optical signal S by a DSP (not illustrated) in the transmitter 2.

The DSP emulator 401a emulates the transmission processing on the optical signal S between the transmitter 2 and the receiver 3 based on signal data, parameters in the DSP 32 and the transmission-side parameters in the transmitter 2 and computes a Q value on the receiver 3 side from the result. The model training unit 402a trains the behavior model by using the signal data, the parameters in the DSP 32, and the transmission-side parameters. In this case, the model training unit 402a defines the transmission-side parameters and the parameters in the and DSP 32 as inputs to the behavior model and defines the Q value as an output from the behavior model.

The parameter analysis apparatus 1 uses the transmission-side parameters for training the behavior model so that the constructed behavior model may have high precision in consideration of conditions of transmission processing in the transmitter 2.

Next, a procedure of overall operations to be performed by the transmitter 2, the receiver 3, and the parameter analysis apparatus 1 will be described with focus on an averaging length in the phase recovery process and a filter length in the imperfection compensation processing, which are parameters in the DSP 32.

Averaging Length in Phase Recovery Process

For example, in a case where the transmission path 9 is a single mode fiber (SMF) with a high dispersion coefficient, phase noise due to its nonlinearity has a low influence on the optical signal S. However, in a case where the transmission path 9 is a non-zero dispersion fiber (NZ-DSF) with a low dispersion coefficient, a large influence of the phase noise due to its nonlinearity is given on the optical signal S.

In such a case, as the averaging length in the phase recovery process to be set in the DSP 32 decreases, the Q value tends to increase. However, because the Q value is also influenced by the OSNR in the receiver 3, it may be difficult for a person having insufficient knowledge and experiences to set an averaging length in the DSP 32. However, the parameter analysis apparatus 1 may facilitate setting of an averaging length through the following operations.

Figure 13:
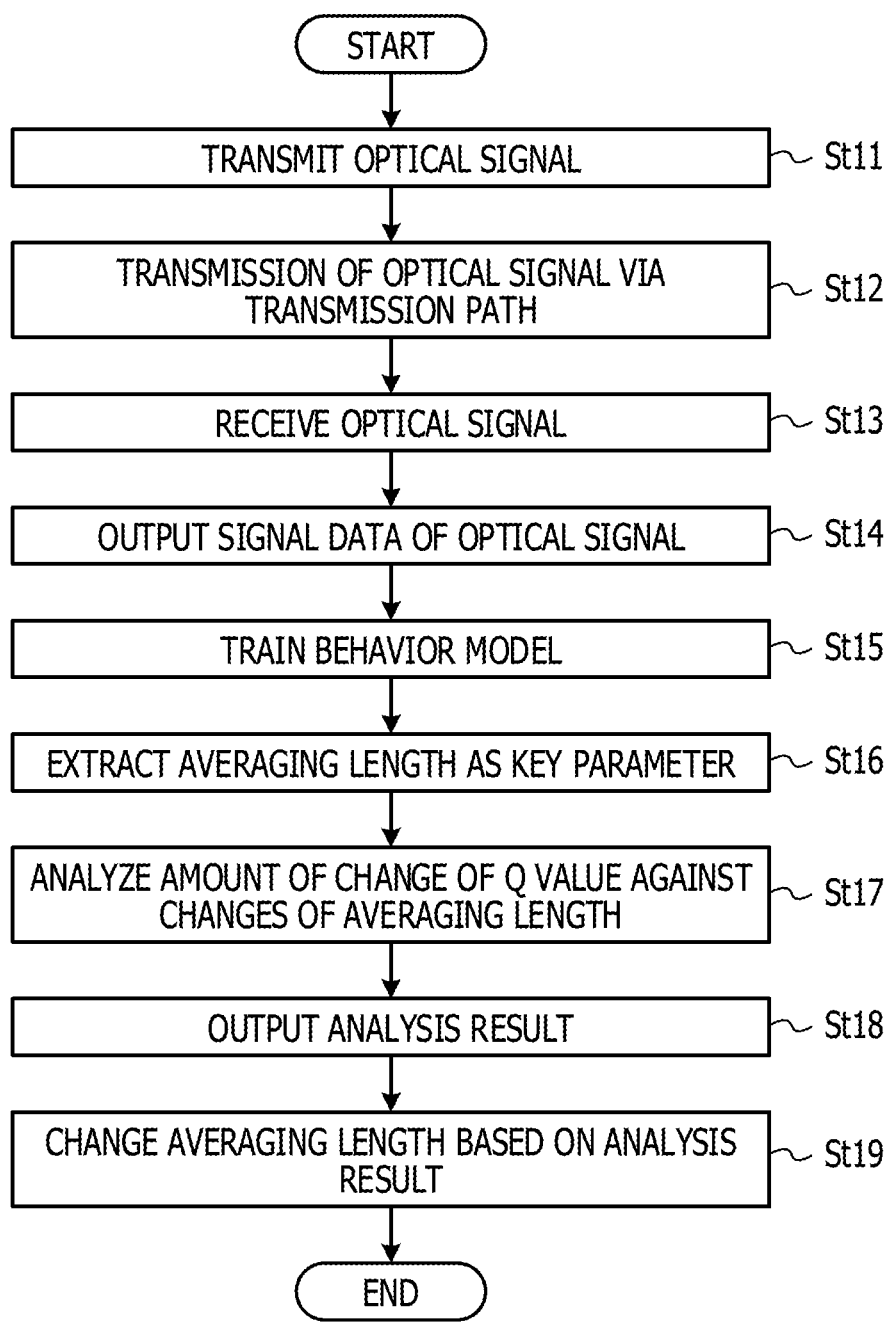
FIG. 13 is a flowchart illustrating an example of a procedure of operations for setting an averaging length for DSP.

FIG. 13 is a flowchart illustrating an example of a procedure for setting an averaging length in the DSP 32. The transmitter 2 transmits an optical signal S (step St11). The optical signal S is transmitted via the transmission path 9 (step St12). The receiver 3 receives the optical signal S (step St13).

Next, the receiver 3 outputs signal data of the optical signal S from the front end 30 and ADC 31 to the parameter analysis apparatus 1 (step St14). Next, the parameter analysis apparatus 1 trains the behavior model with the model training units 402 and 402a by using the signal data (step St15).

Next, the parameter analysis apparatus 1 uses the trained behavior model to extract an averaging length as a key parameter by the key parameter extraction unit 102 (step St16). Next, the parameter analysis apparatus 1 analyzes an amount of change of the Q value against changes of the averaging length by using the behavior analysis unit 103 (step St17).

Next, the parameter analysis apparatus 1 outputs a graph like the one illustrated in FIG. 9 as the analysis result, for example, onto a screen of the output device 16 (step St18). Next, a person in charge of communication settings changes the averaging length to be set in the DSP 32 based on the analysis result output to the screen (step St19).

Thus, the person in charge who has insufficient knowledge and experiences relating to optical fiber may grasp, with reference to the analysis result, the magnitude of an influence of phase noise given by the transmission path 9 onto the optical signal S, which means that he or she may not check the OSNR and may set an averaging length for an improved Q value.

Filter Length in Imperfection Compensation Processing

In a case where, for example, the transmitter 2 and the receiver 3 perform transmission/reception processing on the optical signal S by a high degree of a multi-level modulation such as 64 QAM and 128 QAM, the Q value of the optical signal S in the receiver 3 depends on the imperfection of optical components and analog components within the transmitter 2 and the receiver 3. Accordingly, a DSP (not illustrated) in the transmitter 2 and the DSP 32 in the receiver 3 performs imperfection compensation processing by using filters.

The amount of compensation for imperfection increases as the filter length increases. However, with a longer filter length, the power consumption by the DSP in the transmitter 2 and the DSP 32 in the receiver 3 increases. This means that it may be difficult for a person having insufficient knowledge and experiences to set the filter length. However, the parameter analysis apparatus 1 may facilitate setting of a filter length by following operations.

Figure 14:
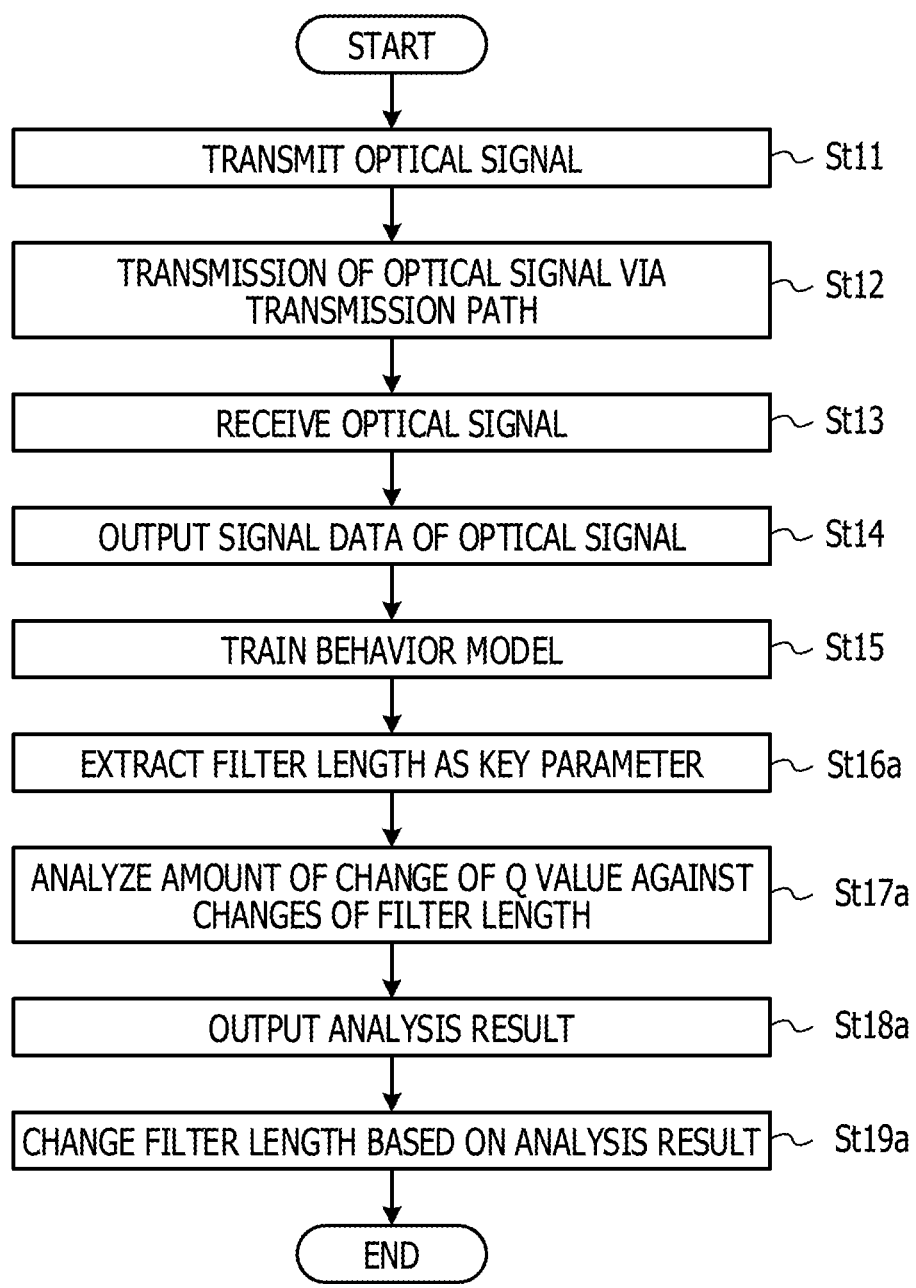
FIG. 14 is a flowchart illustrating an example of a procedure of operations for setting a filter length for DSP.

FIG. 14 is a flowchart illustrating an example of a procedure for setting a filter length in the DSP 32. Like numbers refer to like parts in FIG. 13 and FIG. 14, and any repetitive descriptions will be omitted.

The parameter analysis apparatus 1 uses the trained behavior model to extract a filter length as a key parameter by the key parameter extraction unit 102 (step St16a). Next, the parameter analysis apparatus 1 analyzes an amount of change of the Q value against changes of the filter length by using the behavior analysis unit 103 (step St17a).

Next, the parameter analysis apparatus 1 outputs a graph like the one illustrated in FIG. 9 as the analysis result, for example, onto a screen of the output device 16 (step St18a). Next, a person in charge of communication settings changes the filter length to be set in the DSP 32 based on the analysis result output to the screen (step St19a).

Thus, even a person in charge who has insufficient knowledge and experiences relating to imperfection compensation processing may, with reference to the analysis result, set a filter length for an improved Q value with acceptable power consumption depending on the filter length.

Model Training Method

Next, a training method for a model usable in the parameter analysis method will be described. This training method is executed by the configuration of the behavior model constructing unit 101 illustrated in FIG. 2.

Figure 15:
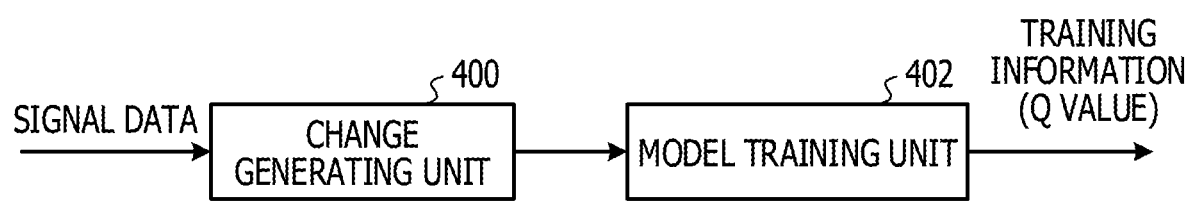
FIG. 15 illustrates an example of a behavior model training method.

FIG. 15 illustrates an example of the training method for a behavior model. Like numbers refer to like parts in FIG. 2 and FIG. 15, and any repetitive descriptions will be omitted.

The change generating unit 400 changes a characteristic of signal data usable for training the behavior model. The model training unit 402 receives, as an input, signal data with the characteristic changed by the change generating unit 400 and trains the behavior model by using the signal data. Because the behavior model outputs a Q value, as described above, the model training unit 402 outputs training information including the Q value.

According to the training method in this example, because the characteristic of an optical signal usable for training changes, a behavior model with high precision may be constructed like the parameter analysis method.

According to this embodiment, the model training unit 402 trains a behavior model by using the Q value calculated by the DSP emulator 401 as supervised data (supervised label). The supervised data is not limited thereto, but a value measured by an external measurement device may be used, for example.

Figure 16:
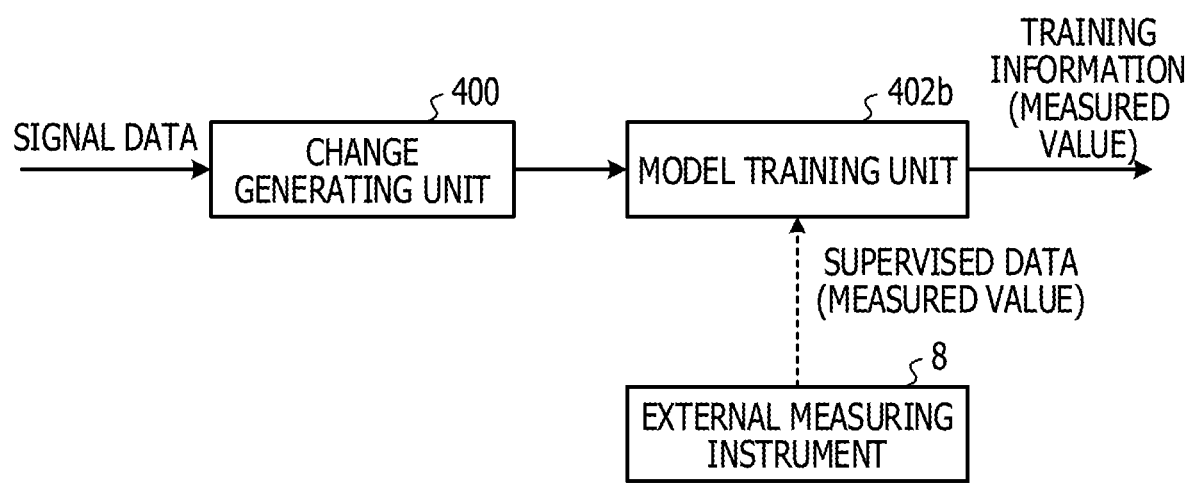
FIG. 16 illustrates an example of a behavior model training method in a case where an external measuring instrument is used.

FIG. 16 illustrates an example of a behavior model training method by using an external measuring instrument 8. According to this example, instead of the model training unit 402, a model training unit 402b is used which is configured to obtain a measured value as supervised data from the external measuring instrument 8.

The external measuring instrument 8 is configured to output a measured value to the model training unit 402b over a management network, for example. The measured value of the external measuring instrument 8 may be an OSNR detected by a light spectrum analyzer, a modulation technology read out from a setting database or an amount of wavelength dispersion measured by an amount-of-wavelength dispersion measuring instrument, for example.

Also in this example, the change generating unit 400 outputs signal data with a changed characteristic of an optical signal to the model training unit 402*b*. Thus, a behavior model with high precision may be constructed, like the aforementioned embodiments.

The aforementioned processing functions may be implemented by a computer. In this case, a program describing processing details of the functions to be implemented by a processing device is provided. The program may be executed by the computer so that the processing functions may be implemented on the computer. The program describing processing details may be recorded in a computer-readable recording medium (excluding carrier waves).

The program may be recorded and be distributed in a portable recording medium such as a digital versatile disc (DVD) and a compact disc read only memory (CD-ROM). The program may be stored in a storage device in a server computer, and the program may be transferred from the server computer to another computer over a network.

The computer which executes the program may store, in its storage device, the program recorded in a portable recording medium or transferred from a server computer, for example. The computer may read the program from its storage device and executes processing based on the program. The computer may read the program directly from a portable recording medium and may execute processing based on the program. The computer may sequentially execute the processing based on the program every time the program is transferred thereto.

The aforementioned embodiments are preferred examples embodying the present disclosure. The embodiments are not limited thereto but may be changed variously without departing from the spirit and scope of the present disclosure.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A parameter analysis method executable by a computer, the method comprising:
   acquiring a signal data from an optical signal that is received;
   randomly generating a plurality of parameters usable for training a model;
   changing a characteristic of the signal data usable for training the model; and
   training the model for analyzing influence of the plurality of parameters set in a signal processing device on an index value which is calculated and output from the signal processing device by processing the signal data.

2. The parameter analysis method according to claim 1, wherein
   the changing the characteristic includes changing a frequency of the optical signal.

3. The parameter analysis method according to claim 1, further comprising:
   extracting one or more parameters having a degree of the influence equal to or higher than a certain value from the plurality of parameters by using the model.

4. The parameter analysis method according to claim 1, further comprising:
   changing the parameters and thus analyzing changes of the index value based on changes of the parameters.

5. The parameter analysis method according to claim 1, further comprising:
   calculating the index value from the optical signal the characteristic of which is changed;
   weighting the optical signal in accordance with the index value, wherein
   the training the model includes controlling the training of the model based on a result of the weighting.

6. The parameter analysis method according to claim 1, wherein
   the training the model includes training the model by using the signal data, the plurality of parameters, and a transmission-side parameter set in a transmitter configured to transmit the optical signal to the signal processing device.

7. The parameter analysis method according to claim 1, wherein the changing the characteristic includes rotating a polarized wave of the optical signal.

8. The parameter analysis method according to claim 1, wherein the acquiring includes:
   acquires the signal data by the photoelectric conversion of the optical signal.

9. A non-transitory computer-readable storage medium storing a program that causes a processor included in a parameter analysis apparatus to execute a process, the process comprising:
   acquiring a signal data from an optical signal that is received;
   training a model for analyzing influence of a plurality of parameters set in a signal processing device on an index value relating to quality of the optical signal processed by the signal processing device;
   randomly generating the plurality of parameters usable for training the model; and
   changing the characteristic of the signal data usable for training the model.

10. A parameter analysis apparatus comprising:
    a memory; and
    a processor coupled to the memory and configured to:
    acquiring a signal data from an optical signal that is received;
    train a model for analyzing influence of a plurality of parameters set in a signal processing device on an index value relating to quality of the optical signal processed by the signal processing device;
    randomly generate the plurality of parameters usable for training the model; and
    change the characteristic of the signal data usable for training the model.

11. The parameter analysis apparatus according to claim 10, wherein
    the changing the characteristic includes changing a frequency of the optical signal.

12. The parameter analysis apparatus according to claim 10, wherein the changing the characteristic includes rotating a polarized wave of the optical signal.

* * * * *